(12) United States Patent
Johanson

(10) Patent No.: US 6,381,330 B1
(45) Date of Patent: Apr. 30, 2002

(54) FALSE TONE DETECT SUPPRESSION USING MULTIPLE FRAME SWEEPING HARMONIC ANALYSIS

(75) Inventor: James A. Johanson, Emmaus, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/218,179

(22) Filed: Dec. 22, 1998

(51) Int. Cl.[7] ................................................. H04M 3/00
(52) U.S. Cl. ........................ 379/386; 379/282; 379/283; 379/351; 379/77; 379/284
(58) Field of Search ................................ 379/88.07, 88, 379/93.06, 93.18, 93, 283, 339, 360, 386; 704/203–205, 233; 324/78; 381/40, 36

(56) References Cited

U.S. PATENT DOCUMENTS

| | | | |
|---|---|---|---|
| 5,263,084 A | | 11/1993 | Chaput et al. ............... 379/215 |
| 5,265,167 A | * | 11/1993 | Akamine et al. ............. 381/40 |
| 5,809,133 A | * | 9/1998 | Bartkowiak ................. 379/386 |

* cited by examiner

Primary Examiner—Forester W. Isen
Assistant Examiner—Ramnandan Singh
(74) Attorney, Agent, or Firm—William H. Bollman

(57) ABSTRACT

Detection of alerting or other tone signals in a composite signal are reliably detected with an improved false tone detect suppression technique which employs the use of a moving window analysis on a subset of frequencies detected within an underlying speech signal performed during each of a plurality of data frames. The composite signal is transformed during each data frame using a discrete Fourier transform comprising the so-called Goertzel Algorithm. All of the Goertzels relating to the tone detection are analyzed during each data frame, but only a subset of the Goertzels relating to the sweeping harmonic analysis of the underlying speech signal are analyzed during any particular data frame. Thus, rather than analyzing the underlying speech signal for the presence of any and all relevant frequencies during each data frame to prevent inadvertent tone detection, a piece wise sweeping harmonic analysis is performed over a plurality of data frames, providing a more efficient and less intensive moving sweeping harmonic analysis. Thus, in addition to the detection of the particular alerting or other tone signal, the underlying speech signal is analyzed over a moving plurality of data frames to provide a 'canceling' effect to the detection of a particular tone in the event that a harmonic frequency relating to the detected tone is present in the underlying speech signal. The result is a reliable, yet inexpensive tone detector.

27 Claims, 5 Drawing Sheets

FALSE TONE DETECT SUPPRESSION USING MULTIPLE FRAME SWEEPING HARMONIC ANALYSIS

BACKGROUND OF THE INVENTION

1. Field of the Invention

The present invention generally relates to methods and apparatuses for detecting the potential for erroneous detection of a frequency in a signal. More particularly, it relates to an efficient harmonic analysis technique for detecting the presence of particular frequencies in a composite signal to recognize the potential for erroneous detection of an alerting or other tone.

2. Background of Related Art

While the present invention relates to the suppression of erroneous tone detection in general, it and its background are described with respect to a particular embodiment useful for detecting alerting tones relating to the reception of call related information, e.g., Caller ID information.

As is well known, Caller ID services permit a telephone customer to learn the identity of, or at least the originating telephone number of, a party seeking to place a telephone call to the customer. An older service referred to as Call-Waiting (CW) alerts a customer engaged in a telephone connection to another party, that a third party desires to place a telephone call to the customer. A newer service offered in telephone systems combines caller identification and call-waiting services, to not only alert a customer during a telephone connection that a third party desires to establish a connection, but also transmits to the CPE, caller identification information identifying the telephone number and/or name of the third party. This latter service is sometimes referred to as CIDCW (caller ID and call waiting) or Caller ID Type II.

Participation in a system with Caller ID and Call Waiting requires not only the presence of a central office capable of providing such service, but also CPE capable of receiving and transmitting the necessary control, acknowledgment and data signals. The general sequence of events during a telephone call in which the customer has Caller ID and Call Waiting service is as follows.

When a customer is currently engaged in a telephone conversation with a second party, a third party desiring to complete a telephone call with the customer may dial the customers number. During the customers conversation with the second party, the central office sends a subscriber alerting signal (SAS) alerting the customer that a third party desires to make a connection with the customer. The subscriber alerting signal is typically a single tone 400-hertz signal of about 500 milliseconds in duration, that is audible to the customer.

The central office follows the transmission of the subscriber alerting signal with the transmission of a CPE alerting signal (CAS). Similar to a dual tone multi-frequency signal, the CPE alerting signal has 2130 hertz and 2750 hertz components and optimally lasts for 80 milliseconds. Upon detection of the CPE alerting signal, the CPE sends a CAS acknowledgment signal (CAS ACK) to the central office, signaling to the central office that the CPE is ready to receive Caller ID information regarding the third party.

At the time the CPE transmits the CAS acknowledgment signal, it also disables the voice transmission transducer in the CPE. While the central office maintains the connection with the second party, it suppresses the CAS acknowledgment signal from the transmission sent to the second party.

When the central office receives the CAS acknowledgment signal, it sends the caller identification information to the customer in the form of a frequency shift keyed (FSK) signal. The CPE can then display the caller identification information on a display unit as is known in the art. Full communication is established with the second party after receipt of the caller identification information. The customer, through the CPE can then decide how to handle the third party, such as placing the second party on hold and establishing the connection with the third party, for example.

Because of the proximity of the CPE alerting signal to voice frequencies transmitted and received in typical telephone systems, reliable detection of the CPE alerting signal can sometimes be a problem in conventional CPEs. For instance, conventional tone detectors used in this capacity sometimes experience "talkoff" episodes in which CPE alerting signals are falsely detected, and "talkdown" episodes in which actual CPE alerting signals are missed due to interference with speech. This erroneous operation is often the result of harmonic components of speech signals occurring in the frequency ranges of a tone signal such as the standard CPE alerting signal.

One conventional approach to eliminating talkoff and talkdown episodes during CPE alerting signal detection is described in U.S. Pat. No. 5,263,084 issued Nov. 16, 1993 to Chaput et al. The Chaput approach appears to be as follows. When the CPE receives the subscriber alerting signal, it mutes its handset for a predetermined period of time to reduce or eliminate background noise, in expectation of the occurrence of a CPE alerting signal conforming to known standards. The muting interval must be chosen to be of sufficient duration to reliably allow silence for CPE alerting signals of a given tolerance (i.e., beginning time, duration). Unfortunately, this technique requires a priori knowledge of the occurrence of an incoming tone signal. Moreover, the muting interval is typically long enough to be noticed by and cause an annoyance to customers engaged in a telephone conversation.

A different conventional approach employs the use of brute-force digital signal processing (DSP) methods, such as the use of fast Fourier transforms (FFTs), to continuously analyze each frame of a digitized signal for the presence of any/all expected tones.

The operation of a conventional frequency detector and suppresser is shown in FIGS. 5A to 5D.

In particular, a series of four contiguous data frames are shown in FIGS. 5A, 5B, 5C and 5D, respectively. A Fast Fourier Transform is performed on each data fame, and each data frame is then tested for each particular frequency which may cause talkoff. Thus, each of the four data frames shown in FIGS. 5A to 5D, respectively, are analyzed by, e.g., a complete set of tone detectors 402–412 relating to tones which might be expected on the signal line.

Using this conventional approach, there is no need for muting to eliminate background noise. However, such an approach is extremely resource-intensive, requiring a great number of iterative calculations, and large memory requirements, which may increase the cost of practical Caller ID- and Call Waiting-capable CPE beyond acceptable levels.

Thus, there is a need for a reliable tone detector (i.e., one which eliminates talkoffs and talkdowns) for detecting CPE alerting signals or other tones without the need for annoying muting intervals, and without using cost prohibitive hardware where intensive digital signal processing methods are utilized to continuously search for any/all present tones.

SUMMARY OF THE INVENTION

In accordance with the principles of the present invention, a false tone detect suppresser comprises a frequency bin grouper adapted to group transformation information into a plurality of frequency bins each relating to a particular frequency in a composite signal. A frequency bin analyzer is adapted to analyze information in only a sub-plurality of the plurality of frequency bins during any particular data frame to provide a basis for indicating a presence of a harmonic relating to a tone being detected in the composite signal.

A method of suppressing a false tone in a composite signal including a speech related component in accordance with another aspect of the present invention comprises transforming the composite signal into a plurality of data frames each containing information relating to a plurality of frequency bins. The plurality of frequency bins are grouped such that fewer than all of the plurality of frequency bins are analyzed in any one of the plurality of data frames. One of the groups are analyzed during each of the plurality of data frames for a presence of associated frequency components such that a sweeping harmonic analysis of the speech related component in the composite signal is performed once over the plurality of data frames.

A tone detection method for detecting a specified tone signal in an input signal containing background noise in accordance with yet another aspect of the present invention comprises transforming the input signal into successive frames having a predetermined number of frequency bins. The successive frames are partitioned into a predetermined number of frequency bins. The frequency bins of a frame are grouped into a predetermined number N of multiple groups, each group corresponding to one of several contiguous temporal windows defined for all frames. A group of frequency bins are analyzed according to predetermined sound algorithms during a predetermined analysis period during a temporal window. A presence of the specified tone signal is indicated. For each successive frame, a group of frequency bins corresponding to a temporal window contiguous to the temporal window considered for the previous frame is analyzed until a frequency bin analysis is performed for every predefined temporal window.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

In accordance with the principles of the present invention, a sweeping harmonic analysis of a noise signal (e.g., voice on a telephone line) is performed in piecewise fashion over a plurality of data frames to indicate the presence of matching harmonic frequencies in a composite signal which might cause erroneous tone signal detection.

The present invention recognizes the performance versus cost limitations of current customer premise equipment (CPE), e.g., equipment capable of operation in a telephone system with combined call-waiting and caller identification (caller ID) services. It also recognizes the fact that speech harmonics (that is, the frequency components of speech including fundamental frequencies and the integral multiples) change little relative to the duration of CPE alerting or other tone signals.

In accordance with the principles of the present invention, a series of snapshots of particular frequencies (or groups of frequency 'bins') resulting from a discrete Fourier transform analysis on each of a plurality of separate data frames are determined to provide a reasonable estimate of the nature of speech harmonics which are present in a signal together with a CPE alerting or other tone signal.

The present invention recognizes that corresponding temporal windows in successive frames of voice based signals tend to have only small changes in harmonic frequency content. Using this fact, the present invention spreads out a detection of particular frequencies (i.e., particular frequency bins) over a plurality of data frames instead of performing a complete analysis on each data frame as is done in conventional systems. Accordingly, the number of calculations is greatly reduced without significant degradation in its performance.

The present invention incorporates a moving temporal window in which different frequencies (i.e., different frequency bins) are analyzed during each new data frame, until all relevant harmonic frequencies are swept through, and thereafter the process repeats.

While the disclosed embodiments relate to analysis of contiguous frequency bins during each data frame, the principles of the present invention relate equally to the analysis of non-contiguous and/or even random selection of the particular frequency bins to be analyzed during any particular data frame.

Figure 1:
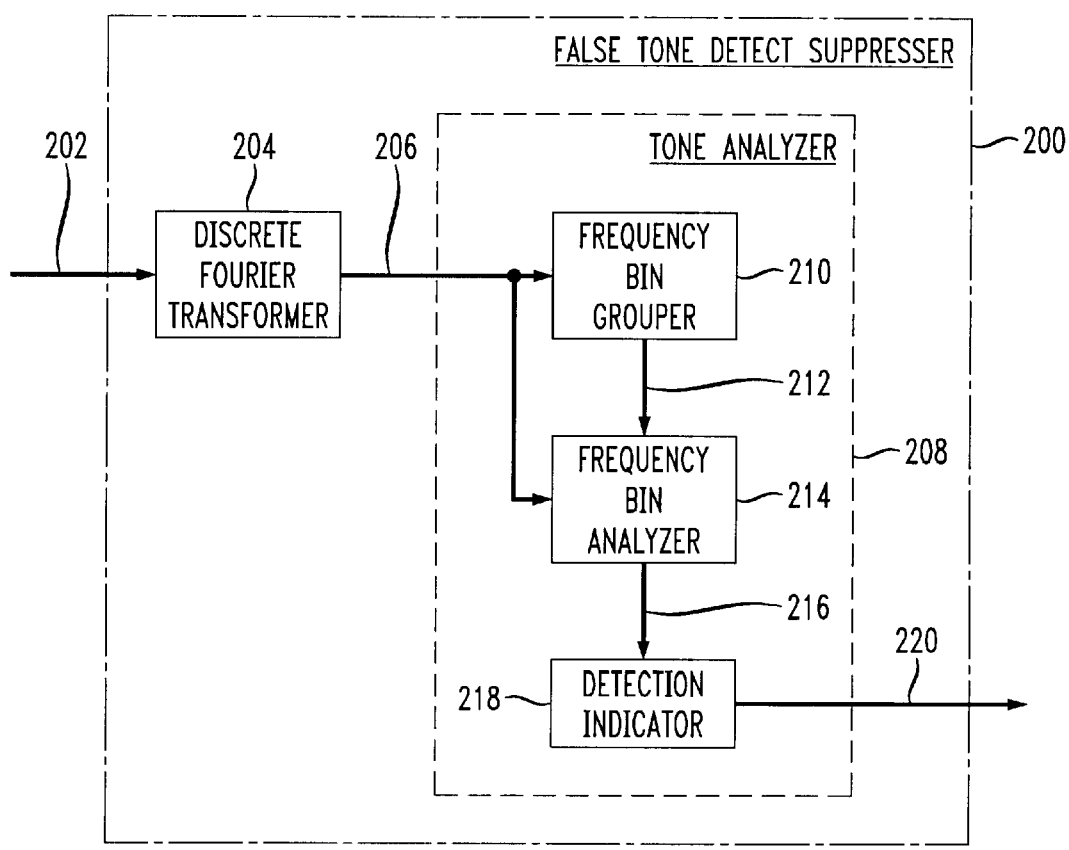
FIG. 1 shows a general block diagram of a false tone detect suppresser to perform a sweeping harmonic analysis on a noise signal to prevent the possibility of erroneous detection of an alerting or other tone signal, in accordance with the principles of the present invention.

The present invention can be implemented using the false tone detect suppresser 200 generally diagrammed in FIG. 1.

In particular, in FIG. 1, the false tone detect suppresser 200 includes a Fourier transformer, e.g., discrete Fourier transformer 204, and a tone analyzer 208.

The false tone detect suppresser 200 receives a composite signal 202 from, e.g., a central office over a telephone line. The composite signal 202 may contain voice transmissions, etc. from any party on the telephone line together with a CPE alerting or other tone signal.

The discrete Fourier transformer 204 performs a discrete Fourier transform on each data frame signal 202 input to the false tone detect suppresser 200. The disclosed discrete Fourier transformer 204 includes hardware and software to implement a Goertzel Algorithm to perform a discrete Fourier transformation of the composite input signal, typically including voice signals. The resulting transformation signal 206 comprises information relating to a plurality of frequency-domain bins (called "Goertzels" in the present description). The transformed signal 206 is input by the tone analyzer 208, which performs the bulk of CPE alerting signal detection in the preferred embodiment.

The tone analyzer 208 includes, broadly, a frequency bin grouper 210, a frequency bin analyzer 214, a detection indicator 218, and an output 220.

The detection indicator 218 outputs a false tone detection signal 220. The false tone detection signal 220 indicates the presence of a harmonic frequency in the composite signal which may cause a false tone detect or talkoff.

The effect of the moving frequency analysis window with respect to different frequency bins relating to the speech analysis portion of a composite signal in accordance with the principles of the present invention is depicted in FIGS. 2A to 2D.

In particular, a first data frame is transformed by the discrete Fourier transformer 204 (FIG. 1) and processed with respect to a sub-set of all desired frequencies to be performed in a sweeping harmonic analysis of the input signal 206.

The disclosed embodiment utilizes six frequency bins 402–412 to collectively constitute a sweeping harmonic analysis of the speech related portion of the composite signal 202. Of course, fewer or greater than six frequency bins can be implemented, depending upon the particular application. Moreover, the tone analyzer 208 may additionally include a number of frequency bins relating to detection of an alerting or other tone signal in addition to the detection of the presence of debilitating harmonic frequencies in the underlying speech signals.

Figure 2A:
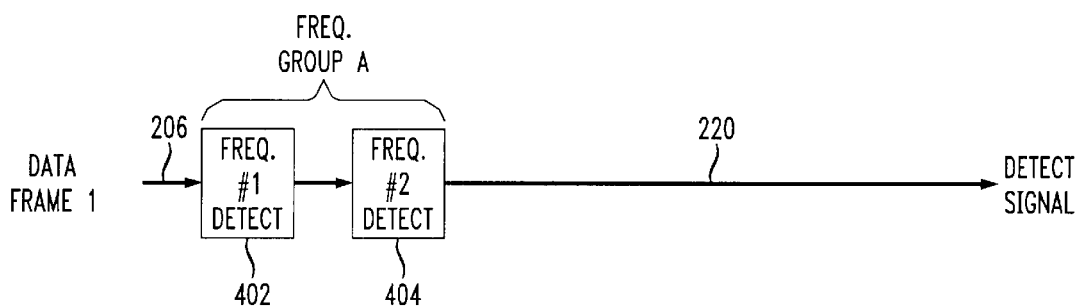
FIGS. 2A to 2C show an exemplary operation of the false tone detect suppresser shown in FIG. 1.

In accordance with the principles of the present invention, less than all frequency bins 402–412 are analyzed during a first data frame, e.g., only frequency bins 402–404 as shown in FIG. 2A. Similarly, less than all frequency bins 402–412, e.g., only frequency bins 406–408 are analyzed during a second data frame as shown in FIG. 2B, and only frequency bins 410–412 are analyzed during a third data frame as shown in FIG. 2C.

In the disclosed embodiment, a data frame is approximately 4 milliseconds in length, although shorter or longer data frames are also within the principles of the present invention.

It is within the principles of the present invention to analyze certain frequency bins more than others over any given number of data frames, particularly for more dynamic frequencies which change more frequently in voice patterns than others. Moreover, it is also within the principles of the present invention to analyze different numbers of frequency bins in different data frames.

Figure 2B:
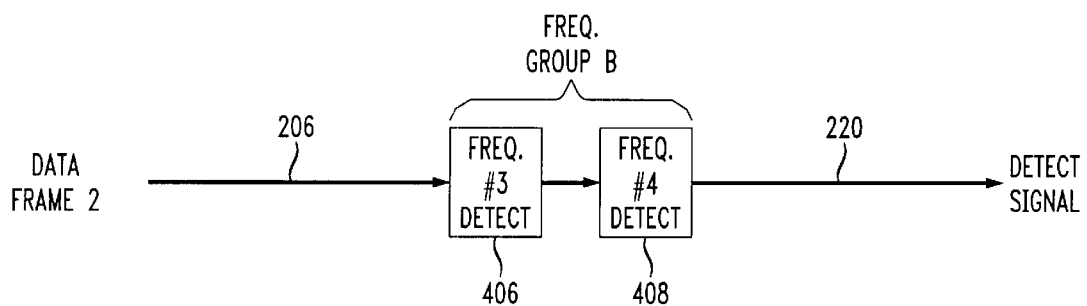
Figure 2C:
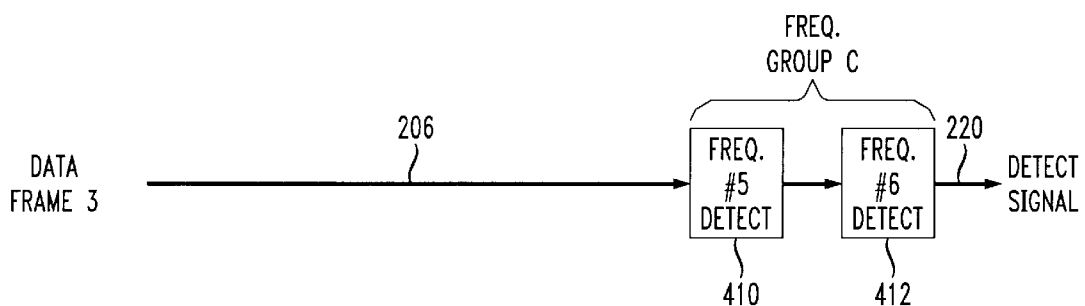

FIGS. 2A to 2C show the principles of the moving window analysis with respect to the underlying speech portion of the composite signal. In a preferred embodiment utilized for reliably detecting the presence of a CAS alerting tone in the presence of underlying voice signals, every frame of the transformed signal 206 has 6 Goertzels used for tone signal analysis, and 16 Goertzels used for speech analysis. Of course, it should be understood that the particular number of Goertzels, either comprised in the transformed signal 206 or analyzed in any one particular data frame, is not limited to the particular numbers of Goertzels as disclosed herein.

The frequency bin grouper 210 groups the speech Goertzels into groups of two throughout a frame, as depicted in FIGS. 2A to 2C, although another number could be used. Thus, for performing a sweeping harmonic analysis on 16 Goertzels in groups of two each data frame, a total sweeping harmonic analysis of the underlying speech signal will require a total of 8 data frames in the disclosed embodiment.

In operation, the frequency bin grouper 210 sends the desired small group of speech Goertzels ("$G_{speech}$") (e.g., only 2 of 16 possible Goertzels) relating to that particular data frame via output 212 to the frequency bin analyzer 214. These Goertzels will be used to detect the presence of corresponding debilitating harmonic frequencies in the underlying speech signal.

If, as in the disclosed embodiment, the tone analyzer 208 is also performing detection of a particular alerting or other tone signal in the composite signal, the Goertzels ("$G_{cas}$") relating to all expected tone signals may also be included in the transformation signal 206 and appropriately analyzed during each data frame. In the disclosed embodiment, 6 tone signal Goertzels ("$G_{cas}$") are included in the transformation signal input to the frequency bin analyzer 214. In the disclosed embodiment, only the speech related Goertzels are grouped into sub-groups for analysis in any particular data frame: all relevant tone Goertzels are analyzed in every data frame.

The frequency bin analyzer 214 analyzes the six alerting tone related Goertzels ("$G_{cas}$") and the selected sub-group of speech related Goertzels ("$G_{Speech}$") according to the associated amount of spectral energy to make a decision as to whether a particular alerting or other tone signal has occurred during a data frame. If the harmonic analysis performed over the prior number of frames constituting the harmonic analysis (e.g., eight data frames in the disclosed embodiment) result in a positive indication of a frequency also corresponding to a particular alerting or other tone signal detected in a present data frame, the tone indication will be acted on accordingly. For instance, the detection of the tone may be canceled by the presence of the same frequency in the underlying voice signal (which in fact may have caused the detection of the tone signal) to thus avoid erroneous detection of an alerting or other tone signal.

The subsequent groups of speech related Goertzels ("$G_{Speech}$") are analyzed in following data frames until all of the frequency bin groups have been analyzed. For instance, in the preferred embodiment relating to the establishment of 16 speech related Goertzels ("$G_{speech}$"), the speech related Goertzels ("$G_{speech}$") are grouped by the Frequency bin grouper 210 such that a first group contains frequency bins 1–2, a second group contains frequency bins 3–4, a third group contains frequency bins 5–6, etc.

In this constant iterative process, the speech Goertzels are analyzed in the following exemplary manner starting with time 0 ms as shown in Table I:

TABLE I

Frame 1-Group 1 (0–4 ms)
Frame 2-Group 2 (4–8 ms)
Frame 3-Group 3 (8–12 ms)
Frame 4-Group 4 (12–16 ms)
Frame 5-Group 5 (16–20 ms)
Frame 6-Group 6 (20–24 ms)
Frame 7-Group 7 (24–28 ms)
Frame 8-Group 8 (28–32 ms)
(reset group counter)
Frame 9-Group 1 (32–36 ms)
Frame 10-Group 2 (36–40 ms)
Frame 11-Group 3 (40–44 ms)
Frame 12-Group 4 (44–48 ms)
Frame 13-Group 5 (48–52 ms)
Frame 14-Group 6 (52–56 ms)
Frame 15-Group 7 (56–60 ms)
Frame 16-Group 8 (60–64 ms)
(reset group counter)
Frame 17-Group 1 (64–68 ms)
Frame 18-Group 2 (68–72 ms)

In an alternate embodiment, the groups can overlap with contiguous groups, containing as their first bin, the last bin of the previous group, although this approach may require additional processing capability.

Preferably, any potential alerting or other tone signal, e.g., a CAS tone, will have any given Goertzel bin analyzed at least twice. For instance, in current U.S. practice, even though a CAS tone should be present in a composite signal for at least 80 milliseconds, it should be declared after about 64 ms of analysis because noise reduces the effective CAS duration from 80 ms to about 64 ms. Windowing through the frequency bins in this manner allows for effective reduction in "talkoffs" without the need for a full fast Fourier transformation and analysis for all frequencies in a sweeping harmonic analysis of an input composite signal. This also reduces the number of frequency bins needed for speech analysis to the point where, e.g., six frequency bins for CAS tone analysis is feasible.

Rather than a fast Fourier transform as in typical conventional tone detectors, the present invention uses a Goertzel Algorithm to perform a discrete Fourier transform on an input signal, e.g., on a signal from a telephone line. Goertzel Algorithms are described in many references, including, for example, Alan V. Oppenhelm and Ronald W. Schafer, (Englewood Cliffs, New Jersey: Prentice-Hall, 1989), 585–87.

The Goertzel Algorithm is defined by the following equation:

$$H_{f_i}(z) = \frac{1 - e^{-j2\pi f_i/f_s} z^{-1}}{1 - 2\cos(2\pi f_i/f_s)z^{-1} + z^{-2}}$$

where $f_i$ is the frequency of interest and $f_s$ is the sampling frequency.

Figure 3:
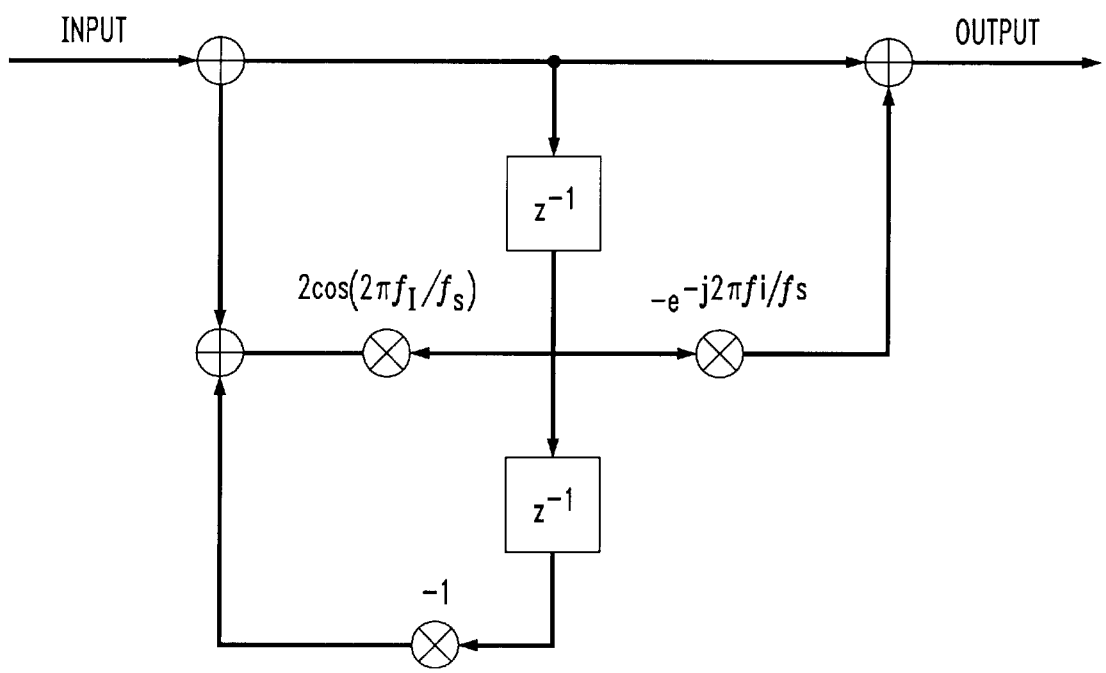
FIG. 3 shows an exemplary second order recursive infinite impulse response filter suitable for implementing a Goertzel Algorithm for detection of tones, in accordance with the principles of the present invention.

Those skilled in the art of digital signal processing will recognize that a second order recursive infinite impulse response filter, such as the one in FIG. 3, can be used for discrete Fourier transformation of signals with the Goertzel Algorithm.

As may be further recognized by those skilled in the art, such a filter uses feedback to generate a very high Q band pass filter where the coefficients are easily generated from the required center frequency, according to the above equation. The signal energy before and after filtering is compared. Input signals are assumed to be centered in the pass band if the energies are similar, and are assumed to be outside of the pass band if the filtered energy is significantly lower than the input energy.

Figure 4:
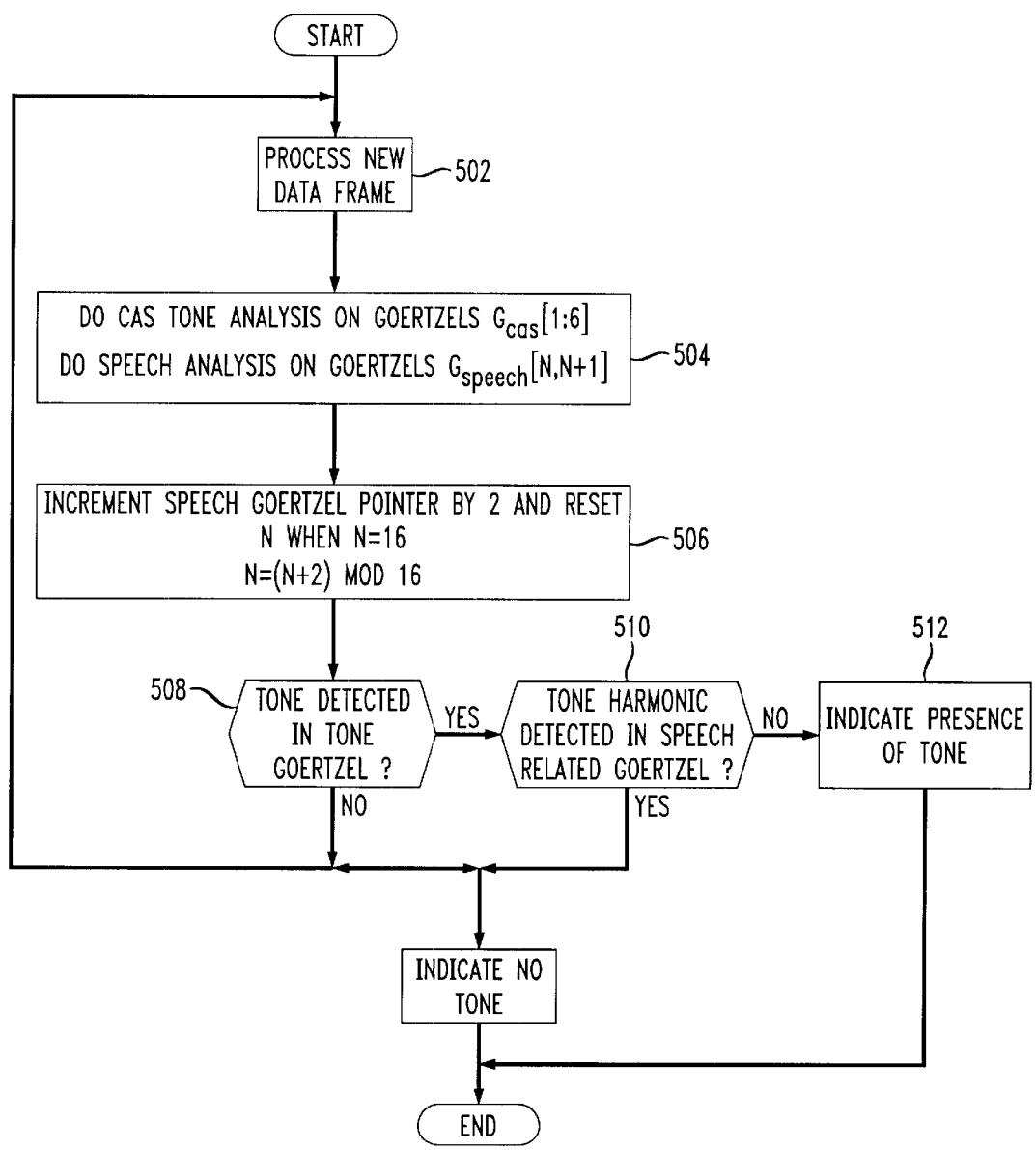
FIG. 4 is a flowchart showing an exemplary process for detecting tones with false tone or talkoff suppression, in accordance with the principles of the present invention.
Figure 5A:
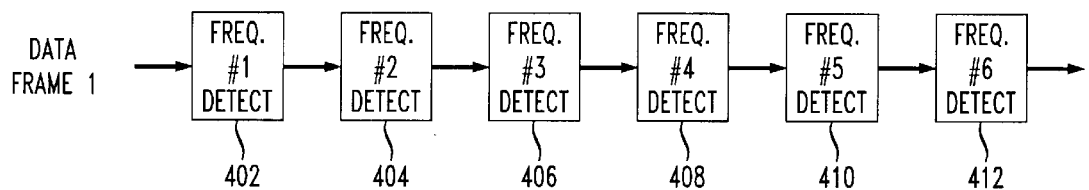
FIGS. 5A to 5D show conventional operation of a false tone detect suppresser.
Figure 5B:
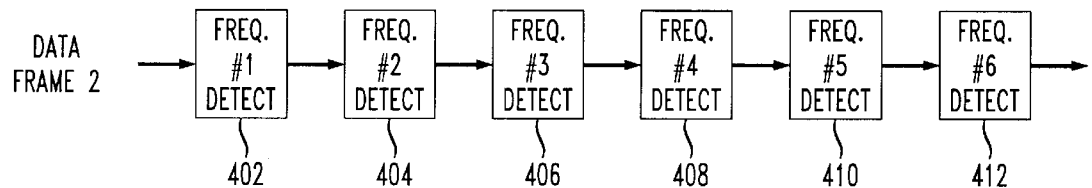
Figure 5C:
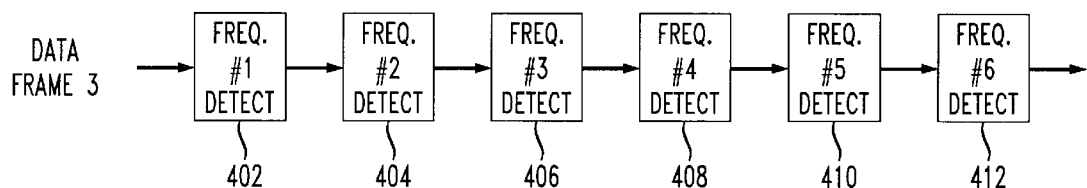
Figure 5D:
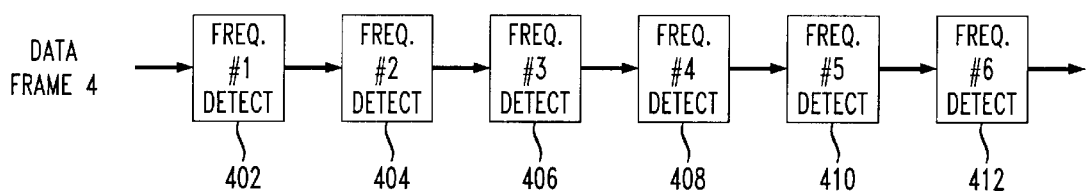

FIG. 4 shows an exemplary process for detecting tones with false tone or talkoff suppression, in accordance with the principles of the present invention.

In particular, a new data frame is processed (i.e., discrete Fourier transformed) in step 502.

In step 504, tone analysis is performed on the 6 tone related Goertzels ($G_{CAS}$), and on the group of speech related Goertzels ($G_{speech}$) assigned for analysis during the relevant data frame.

In step 506, a speech related Goertzel pointer is incremented by the number of speech related Goertzels ($G_{speech}$) in each group, i.e., 2 in the disclosed embodiment. If the Goertzel pointer exceeds the total number of speech related Goertzels ($G_{speech}$), e.g., 16, then the speech related Goertzel pointer is reset after incrementing.

In step 508, if the particular alerting or tone signal is detected in one of the 6 tone related Goertzels, then the process continues to step 510 for possible 'cancellation' if a similar harmonic frequency is present in the underlying speech signals. If no tone is detected, the process proceeds to processing the next data frame in step 502.

In step 510, a detected tone is effectively canceled if a harmonic frequency relating to the detected tone is present as determined by the sweeping harmonic analysis performed over the present data frame (and previous data frames as necessary, e.g., the sweeping harmonic analysis performed over the previous 8 data frames as in the disclosed embodiment).

In step 512, if a particular alerting or other tone signal was detected in one or more of the tone related Goertzels, and harmonics relating to that same tone signal are not detected in the piece wise sweeping harmonic analysis performed using the grouped speech related Goertzels, then the detected tone is indicated.

Thus, an improved and novel tone detector using digital signal processing has been described. Certainly, variations and modifications of the present invention are possible, given the above description. However, all variations and modifications which are obvious to those skilled in the art to which the present invention pertains are considered to be within the scope of the protection granted by this Letters Patent.

For example, the false tone detect suppression provided by the tone detector of the present invention is not limited to the detection of CAS tones, nor to the detection of Caller ID information, nor even to the exclusive use in telephonic equipment at all.

While the invention has been described with reference to the exemplary embodiments thereof, those skilled in the art will be able to make various modifications to the described embodiments of the invention without departing from the true spirit and scope of the invention.

What is claimed:

1. A false tone detect suppresser, comprising:
    a frequency bin grouper adapted to group transformation information into a plurality of frequency bins each relating to a particular frequency in a data frame of a composite signal; and
    a frequency bin analyzer adapted to analyze in a single pass information in only a sub-plurality of said plurality of frequency bins during any particular data frame to provide a basis for indicating a presence of a harmonic relating to a tone being detected once in said composite signal over a plurality of said data frames.

2. The false tone detect suppresser according to claim 1, wherein:
    said sub-plurality of frequency bins are contiguous.

3. The false tone detect suppresser according to claim 1, wherein:
    said harmonic is caused by an underlying speech component in said composite signal.

4. The false tone detect suppresser according to claim 1, wherein:
    said presence of said particular frequency is based on an analyzed spectral energy in said relevant frequency bin relating to said particular frequency.

5. The false tone detect suppresser according to claim 1, further comprising:
    a tone detector adapted to detect a presence of a tone signal relating to said particular frequency in said composite signal.

6. The false tone detect suppresser according to claim 5, wherein:
    said analyzed presence of said particular frequency cancels said detected presence of said tone.

7. The false tone detect suppresser according to claim 6, further comprising:
    a detection indicator adapted to output a signal indicating a presence of said detected tone in said composite signal provided said particular frequency is not detected as being present in an underlying speech signal.

8. The false tone detect suppresser according to claim 1, wherein:
    each of said plurality of frequency bins during each data frame comprises one Goertzel.

9. The false tone detect suppresser according to claim 1, wherein:
    at least two frequency bins are grouped into each data frame.

10. A method of suppressing a false tone in a composite signal including a speech related component, comprising:
    transforming said composite signal into a plurality of data frames each containing information relating to a plurality of frequency bins;
    grouping said plurality of frequency bins such that fewer that all of said plurality of frequency bins are analyzed in any one of said plurality of data frames; and
    analyzing in a single pass one of said groups during each of said plurality of data frames for a presence of associated frequency components such that a sweeping harmonic analysis of said speech related component is said composite signal is performed once over said plurality of data frames.

11. The method of suppressing a false tone in a composite signal including a speech related component according to claim 10, wherein:
    said transformation is a Fourier transformation.

12. The method of suppressing a false tone in a composite signal including a speech related component according to claim 11, wherein:
    said Fourier transformation is a discrete Fourier transformation.

13. The method of suppressing a false tone in a composite signal including a speech related component according to claim 12, wherein:
    said discrete Fourier transformation comprises a Goertzel equation.

14. Apparatus for suppressing a false tone in a composite signal including a speech related component, comprising:
    means for transforming said composite signal into a plurality of data frames each containing information relating to a plurality of frequency bins;
    means for grouping said plurality of frequency bins such that fewer than all of said plurality of frequency bins are analyzed in any one of said plurality of data frames; and means for analyzing in a single pass one of said groups during each of said plurality of data frames for a presence of associated frequency components such that a sweeping harmonic analysis of said speech related component is said composite signal is performed once over said plurality of data frames.

15. The apparatus for suppressing a false tone in a composite signal including a speech related component according to claim 14, wherein said means for transforming comprises:
    a Fourier transform.

16. The apparatus for suppressing a false tone in a composite signal including a speech related component according to claim 15, wherein said Fourier transform comprises:
    a discrete Fourier transform.

17. The apparatus for suppressing a false tone in a composite signal including a speech related component according to claim 16, wherein:
    said discrete Fourier transformation comprises a Goertzel equation.

18. A tone detection method for detecting a specified tone signal in an input signal containing background noise, comprising:
    transforming said input signal into successive frames having a predetermined number of frequency bins;
    partitioning said successive frames into a predetermined number of frequency bins;
    grouping said frequency bins of a frame into a predetermined number N of multiple groups, each group corresponding to only a sub-plurality of said frequency bins and one of several contiguous temporal windows defined for all frames;
    analyzing one of said number N of multiple groups corresponding to only said sub-plurality of said frequency bins according to predetermined sound algorithms during a predetermined analysis period during a temporal window; and
    indicating a presence of said specified tone signal;
    wherein for each successive frame, a group of frequency bins corresponding to a temporal window contiguous to the temporal window considered for the previous frame is analyzed until a frequency bin analysis is performed once for every predefined temporal window.

19. The tone detection method for detecting a specified tone signal in an input signal containing background noise according to claim 18, wherein:
    said predetermined sound algorithms include tone and speech algorithms.

20. The tone detection method for detecting a specified tone signal in an input signal containing background noise according to claim 18, wherein:
    an analysis period is equal to a duration of a successive frame divided by said predetermined number N.

21. The tone detection method for detecting a specified tone signal in an input signal containing background noise according to claim 18, wherein:
    said tone signal is a customer premise equipment alerting signal.

22. The tone detection method for detecting a specified tone signal in an input signal containing background noise according to claim 21, wherein:
    said alerting signal relates to the transmission of call related information regarding an incoming telephone call.

23. The tone detection method for detecting a specified tone signal in an input signal containing background noise according to claim 22, wherein:
    said call related information is Caller ID information.

24. The tone detection method for detecting a specified tone signal in an input signal containing background noise according to claim 18, wherein:
    said transforming performs a Fourier transformation.

25. The tone detection method for detecting a specified tone signal in an input signal containing background noise according to claim 24, wherein:
    said Fourier transformation utilizes a Goertzel equation.

26. The tone detection method for detecting a specified tone signal in an input signal containing background noise according to claim 18, wherein:

an analysis period is equal to a duration of a frame divided by said predetermined number N; and said transformation utilizes a Goertzel Algorithm.

27. Apparatus for detecting a specified tone signal in an input signal containing background noise, comprising:

means for transforming said input signal into successive frames having a predetermined number of frequency bins;

means for partitioning said successive frames into a predetermined number of frequency bins;

means for grouping said frequency bins of a frame into a predetermined number N of multiple groups, each group corresponding to only a sub-plurality of said frequency bins and one of several contiguous temporal windows defined for all frames;

means for analyzing one of said number N of multiple groups corresponding to only said sub-plurality of said frequency bins according to predetermined sound algorithms during a predetermined analysis period during a temporal window; and means for indicating a presence of said specified tone signal;

wherein for each successive frame, a group of frequency bins corresponding to a temporal window contiguous to the temporal window considered for the previous fame is analyzed until a frequency bin analysis is performed for every predefined temporal window.

* * * * *